Oct. 7, 1947.  A. T. SCHEIWER  2,428,638

COUPLING

Filed May 21, 1945

INVENTOR.

BY Albert T Scheiwer

Patented Oct. 7, 1947

2,428,638

UNITED STATES PATENT OFFICE 2,428,638

COUPLING

Albert T. Scheiwer, Erie, Pa.

Application May 21, 1945, Serial No. 594,931

4 Claims. (Cl. 284—19)

This invention relates generally to couplings and more particularly to a novel check valve for a coupling.

Check valves hereto disposed in male and female members of couplings have required comparatively long and closely coiled springs in that the body of the check valve was necessarily stopped by the spring. The springs in these prior couplings quickly lost their strength and many times became snarled because of the force of the bodies of the check valves against them. These prior couplings required the bodies of the check valves to be of the same outside diameter as the inner diameter of the male and female members thereby greatly impeding the flow of fluid through the coupling. Prior couplings had check valves which allowed only a restricted flow of fluid. Furthermore, dust got into prior couplings and much fluid was wasted between the sealing portion of the check valve and end of the coupling members.

It is, accordingly, an object of my invention to overcome the above and other defects in the check valves in couplings and it is more particularly an object of my invention to provide check valves for a coupling which is simple in construction, economical in cost, efficient in operation, easy to assemble, and economical in manufacture.

Another object of my invention is to provide a check valve for a coupling which permits a maximum flow of fluid.

Another object of my invention is to provide a check valve for a coupling which closes the end of the coupling members when in a disconnected position and one which provides a minimum loss of fluid upon disconnection of the coupling members.

Another object of my invention is to provide novel means for limiting the movement of a check valve in the male or female member of a coupling.

Another object of my invention is to provide a coupling with check valves of minimum size and maximum flow.

Another object of my invention is to provide a check valve with a central bearing surface which permits free flow of fluid.

Other objects of my invention will become evident from the following detailed description, taken in conjunction with the accompanying drawings, in which Fig. 1 is an end elevational view of my novel coupling.

Figure 1:
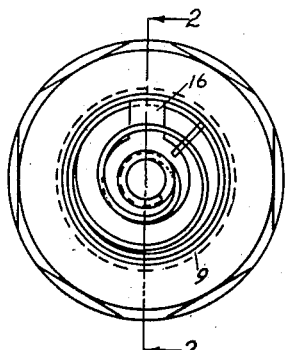
Figure 2:
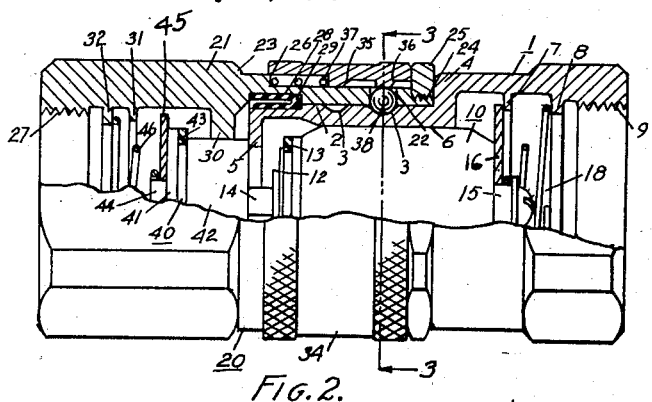
Fig. 2 is a view taken on the line 2—2 of Fig. 1.
Figure 3:
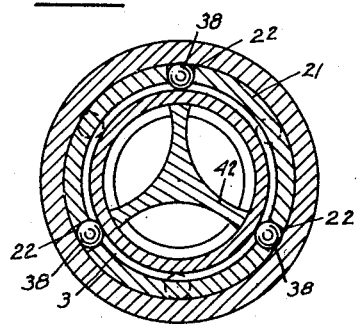
Fig. 3 is a view taken on the line 3—3 of Fig. 2.
Figures 4, 5:
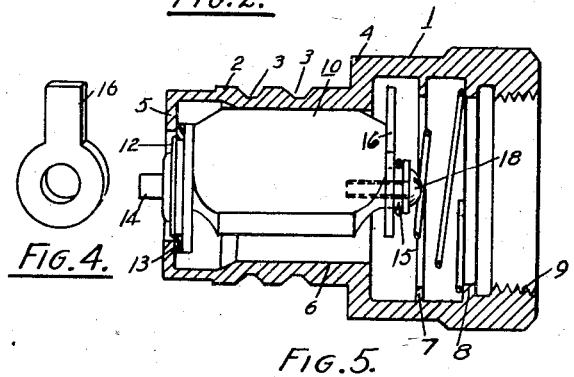
Fig. 4 is a perspective view of the novel stop member for the check valves in my novel coupling.
Fig. 5 is a longitudinal sectional view of the male member of my novel coupling.
Figure 6:
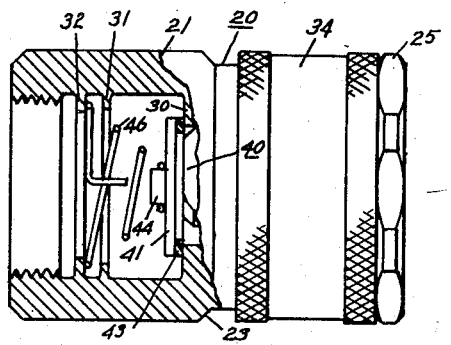
Fig. 6 is a side elevational view with parts broken away of the female member of my novel coupling.

Referring now to the drawings, Figs. 1 to 6 inclusive show a male member 1 comprising a connecting portion 2 having grooves 3, a shoulder 4, an end flange 5, a reduced portion 6, spaced inner shoulders 7 and 8 and a threaded portion 9 for connection to a hose connection or the like (not shown). A check valve 10 is disposed in the male member 1 and comprises a radially armed body portion 11, a grooved nose portion 12, a washer 13 in the grooved nose portion for sealing engagement with the end flange 5 of the male member 1, a forwardly and rearwardly projecting portion 14, and 15, a radially extending stop member 16 disposed on the projecting portion 15 for limiting the rearward longitudinal movement of the check valve 10 by engagement with the shoulder 7 in the male member 1, and a spring member 17 having one end disposed on the projecting portion 15, and held by washer and screw assembly 18 and the other end disposed between the spaced shoulders 7 and 8 of the male member 1 to urge the washer 13 to sealing engagement with the end flange 5 of the male member 1.

The female member 20 comprises a sleeve or shell 21 having two rows of ball retaining apertures 22, a shoulder 23, a threaded portion 24 for threadably engaging a stop member 25, a shoulder 26, an inner threaded portion 27 for engagement with a hose connection or the like (not shown), an inner groove 28 for receiving a U-shaped washer 29, a reduced portion 30, and spaced inner shoulders 31 and 32; and an outer movable locking sleeve 34 having depending camming portions 35 and 36 and a spring member 37 for urging the locking sleeve 34 longitudinally to lock ball members 38 into locking engagement with the grooves 3 in the male member 1. A check valve 40 is disposed in the female member 20 and comprises a grooved body portion 41, radially extending projecting arm members 42 journalled in the reduced portion 30 of the female member 20 and engageable with the end flange 5 of the male member 1, a washer 43 disposed in the grooved body portion 41 of the check valve 40 to sealingly engage the side of the reduced portion 30 of the female member 20, a rearwardly projecting member 44 on the body portion 41, a radially extending stop member 45 disposed on the projecting member 44 to limit the rearward movement of the check valve 40 by engagement with the shoulder 31, and a spring member 46 having one end disposed between the spaced shoulders 31 and 32 and the other end on the projecting member 44 of the check valve 40 for urging the washer 43 into sealing engagement with the side of the reduced portion 30 of the female member 20.

In operation, the connecting portion 2 of the male member 1 is inserted into the female member 20 to a locked position shown in Fig. 1. The end flange 5 of the male member 1 engages the projecting armed member 42 and forces the washer 43 in the body member 41 away from the side of the reduced portion 30 permitting the flow of fluid through the female member 20. The projecting portion 14 of the check valve 10 in the male member 1 engages the projecting armed member 42 thereby forcing the washer 13 in the body member 12 away from the end flange 5 permitting the flow of fluid through the male member 1. The stop members 16 and 45 limit the rearward movement of the check valves 10 and 40 and permit a maximum flow of fluid because of the absence of any obstructing members in the path of the fluid.

It will be evident that by the use of stop members and centrally disposed bearing surfaces, a short spring may be used thereby shortening the length of the coupling and a check valve of minimum diameter and minimum resistance to the flow of fluid may be utilized, the initial entrance of fluid to the male member being entirely free of obstruction.

Various changes may be made in the specific embodiment of my invention without departing from the spirit thereof, or from the scope of the appended claims.

What I claim is:

1. A coupling comprising a male member, having an inner reduced portion, an inwardly directed flanged nose portion and a shoulder, a check valve in said male member comprising a body portion, a washer disposed on said body portion adapted to sealingly engage the side of said inwardly directed flanged nose portion of said male member when said male member is disengaged, a radially armed projecting portion journalled in the reduced portion of said male member and a stop member for engaging said inner shoulder of said male member to limit the longitudinal movement of said check valve, and a spring for urging said check valve longitudinally; and a female member adapted to engage said check valve to move said check valve longitudinally against the force of said spring when said male and female members are connected together; and means for connecting said male and female members together.

2. A coupling as set forth in claim 1 wherein said male member has spaced inner shoulders for nesting one end of said spring.

3. A coupling comprising mated male and female cam-type coupling members, each having an inner shoulder and an inwardly directed flange portion a check valve in each of said coupling members comprising a journalled radially-armed portion, a sealing portion, a radially extending stop member adapted to engage said inner shoulder, and a spring in each of said coupling members for urging said sealing portions of said check valves in sealing engagement with said inwardly directed flange portions when said coupling members are disconnected, means for moving said check valves to an unsealed position when said coupling members are connected together, and means for connecting said coupling members together.

4. A coupling comprising a male member having a connecting portion with a groove, spaced inner shoulders, a reduced portion, and an inwardly directed end flange; a check valve disposed in said male member comprising an end plate, a washer disposed on said end plate for sealing engagement with the end flange of male member, a finned body portion extending from said end plate seated in said reduced portion, a stop member on said finned body portion to engage said shoulder to limit the longitudinal movement thereof, and a spring for urging said washer into sealing engagement with said end flange; and a female member, means in said female member for moving said washer on the check valve in the male member away from said end flange when said male and female members are connected together, and means for connecting said male and female members together.

ALBERT T. SCHEIWER.

REFERENCES CITED

The following references are of record in the file of this patent:

UNITED STATES PATENTS

| Number | Name | Date |
|---|---|---|
| 2,265,267 | Cowles | Dec. 9, 1941 |
| 373,256 | Traver et al. | Nov. 15, 1887 |
| 136,396 | Westinghouse | Mar. 4, 1873 |
| 229,720 | Lloyd | July 6, 1880 |
| 2,135,222 | Scheiwer | Nov. 1, 1938 |